US012657148B2

(12) United States Patent
Azario et al.

(10) Patent No.: US 12,657,148 B2
(45) Date of Patent: Jun. 16, 2026

(54) SYSTEM FOR OVERLAY CONFIGURATION OF A DATACENTER NETWORK

(71) Applicant: OVH, Roubaix (FR)

(72) Inventors: Alexandre Azario, Roubaix (FR);
Alexandre Confiant Latour, Roubaix
(FR); Benjamin Andre Jean Guerin,
Lannilis (FR); Hugo Larcher, Roubaix
(FR); Louis Declerfayt,
Marcq-en-Baroeul (FR); **Thibaut
Bernard Dominique Havard**, Lannilis
(FR)

(73) Assignee: OVH, Roubaix (FR)

( * ) Notice: Subject to any disclaimer, the term of this
patent is extended or adjusted under 35
U.S.C. 154(b) by 82 days.

(21) Appl. No.: 18/232,218

(22) Filed: Aug. 9, 2023

(65) Prior Publication Data

US 2024/0054090 A1      Feb. 15, 2024

(30) Foreign Application Priority Data

Aug. 11, 2022    (EP) ..................................... 22306216

(51) Int. Cl.
*G06F 13/40*          (2006.01)
(52) U.S. Cl.
CPC ................................. *G06F 13/4068* (2013.01)
(58) Field of Classification Search
CPC ............. H04L 41/0893; H04L 41/0806; H04L
41/0895; H04L 41/122; G06F 13/4068
See application file for complete search history.

(56) References Cited

U.S. PATENT DOCUMENTS

2018/0287902 A1    10/2018  Chitalia et al.
2021/0067469 A1*    3/2021  Trivino ............... H04L 41/0806

OTHER PUBLICATIONS

European Search Report with regard to the EP Patent Application
No. 22306216.7 completed Jan. 12, 2023.

* cited by examiner

*Primary Examiner* — Ernest Unelus
(74) *Attorney, Agent, or Firm* — BCF LLP

(57)          ABSTRACT

A system for configuring with an overlay configuration, a
datacenter network of networking devices comprising at
least an underlay fabric, an edge, and a ToR switch inter-
connecting one or several hosts on a rack, communicably
connected to each other with an underlay configuration. The
system comprises an API providing a user with a set of
primitives providing instantiation capability of respective
generic networking resources, the primitives being config-
ured to be invoked and assembled by the user so as to
provide an abstracted view of the overlay configuration. The
system further comprises a Workflow engine to compute the
overlay configuration according to the abstracted view, and
an Overlay configuration builder to push the overlay con-
figuration to the ToR switch and the edge. The pushed
overlay configuration configures a NVE in the datacenter
network as one of the ToR switch, depending on the business
use case of the datacenter associated with the identity of the
user.

8 Claims, 13 Drawing Sheets

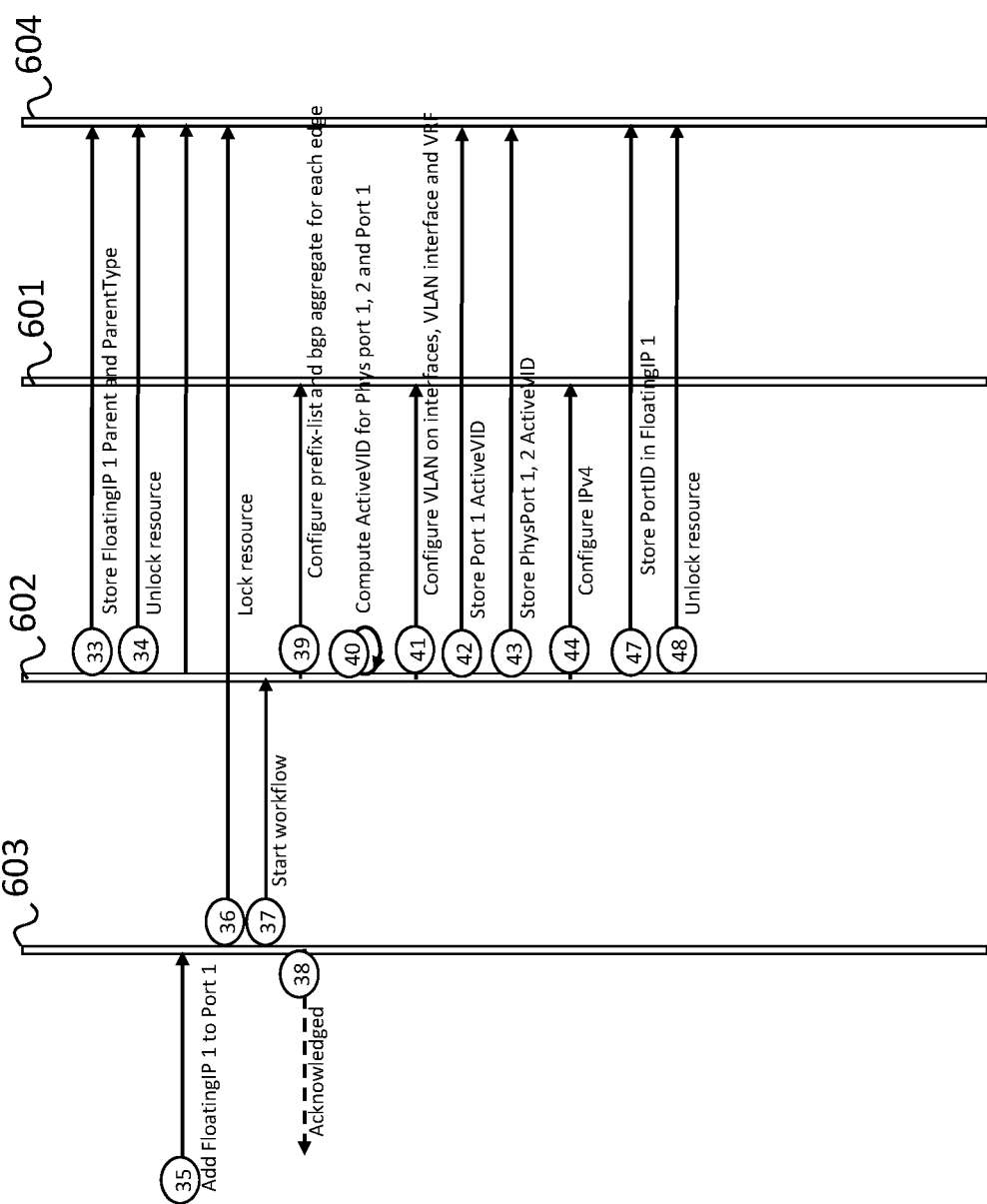
Figure 8b

605

604

601

602

603

| | Store new state |
| 2 | |
| 1 | Create Phys port 1 |
| 3 | Acknowledged |
| | Store new state |
| 5 | |
| 4 | Create Phys port 2 |
| 6 | Acknowledged |
| | Store new state |
| 8 | |
| 7 | Create Port 1 |
| 9 | Acknowledged |
| | Lock resource |
| 11 | |
| 10 | Attach Phys port 1 to Port 1 |
| 12 | Start workflow |
| 14 | Configure ethernet interface |
| 15 | Unlock resource |
| 13 | Acknowledged |
| | Lock resource |
| 17 | |
| 16 | Attach Phys port 2 to Port 1 |
| 18 | Start workflow |
| 20 | Configure ethernet interface |
| 21 | Unlock resource |
| 19 | Acknowledged |
| | Store new state |
| 23 | |
| 22 | Create FloatingIP 1 |
| 24 | Acknowledged |
| | Lock resource |
| 26 | |
| 25 | Add FloatingIP 1 to Port 1 |
| 27 | Start workflow |
| 29 | Configure ToR bgp neighbour |
| 30 | Store Port ID in FloatingIP 1 |
| 31 | Unlock resource |
| 28 | Acknowledged |

Figure 9

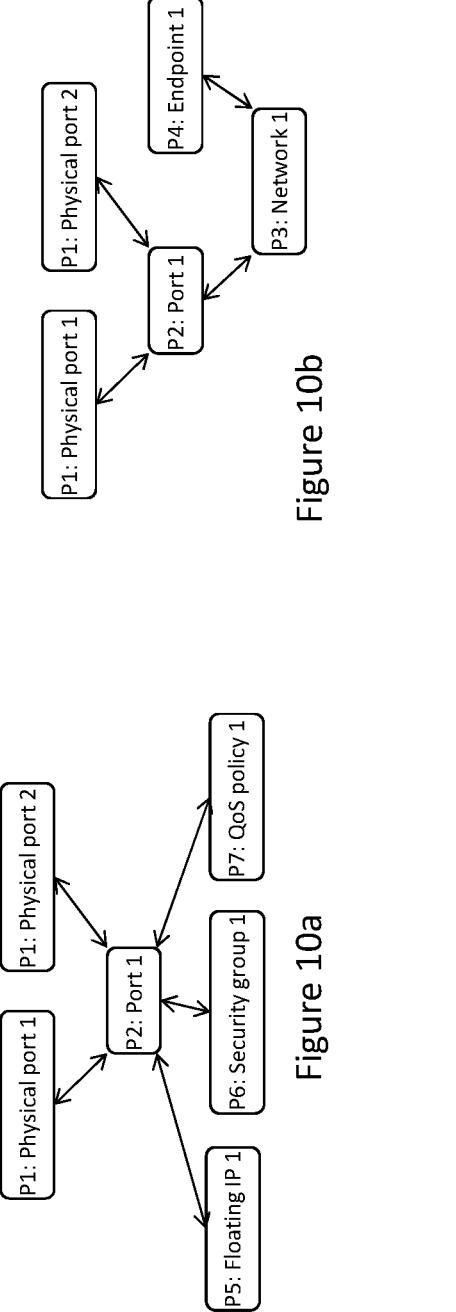
Figure 10a
Figure 10b
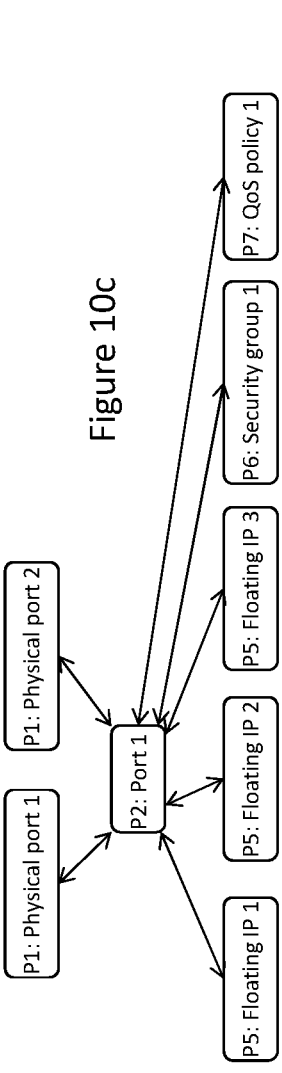
Figure 10c

SYSTEM FOR OVERLAY CONFIGURATION OF A DATACENTER NETWORK

CROSS REFERENCE

The present application claims priority to EP Application No. 22306216.7, filed Aug. 11, 2022 entitled "System For Overlay Configuration Of A Datacenter", the entirety of which is incorporated herein by reference.

FIELD

The present technology relates to configuration of datacenter network, and more particularly to a method and system for overlay configuration of the datacenter network depending on a business use case of the datacenter.

BACKGROUND

Today's operator of a datacenter is often organized into business units that each serve customers with different computing and networking needs. For example, one business unit may offer "bare metal" services, whereby physical resources may be made available to, under control by, its customers, while another business unit may offer "cloud" services, whereby virtual resources may be made available to its customers, while the associated physical resources used to provide such services are under control by the business unit. Despite these different use cases, all of operator's business units share a single network/fabric for cost, scalability and reliability-related reasons. There is therefore a need for network configuration means that enable provisioning of resources adapted for each one of a variety of the network's use cases, in a unified/standard manner across all the business units of the datacenter operator.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art. In particular various aspects of the present technology provide, in a network layered into a configuration underlay as the network infrastructure generically responsible for packet delivery across the fabric, and a configuration overlay, on top of the underlay, API primitives that may be consumed by all business units, for network overlay configuration requests, that may be used to validate requests, and to launch a workflow engine that will execute workflows to apply configurations to devices of the network.

More particularly, various aspects of the present technology cover a system for configuring with an overlay configuration, a datacenter network of networking devices comprising at least an underlay fabric, an edge and a ToR switch, interconnecting one or several hosts on one or several racks; the datacenter network being configured with an underlay configuration so that each networking device in the datacenter network may be communicably connected to each other networking device in the datacenter network, the system comprising:

an API providing a user of the datacenter, having an identity associated with a business use case in the datacenter, with a set of primitives, the primitives providing instantiation capability of respective generic networking resources comprising at least: Physical port, Port, Network, Endpoint, FloatingIP, Security group, and QoS policy;

wherein each primitive comprises a set of fields, and is configured to be invoked by the user according to a first set of rules of creation, and assembled by the user with at least one other primitive according to a second set of rules of assembly, the invoked and assembled primitives providing an abstracted view of the overlay configuration;

a workflow engine to compute the overlay configuration according to the abstracted view; and an overlay configuration builder to push the overlay configuration upon commands received from the workflow engine;

to the ToR switch, whereby depending on the business use case of the datacenter associated with the identity of the user, the ToR switch is configured as a NVE in the datacenter network, or is not an NVE in the datacenter; and to the edge, depending on the business use case of the datacenter associated with the identity of the user.

In aspects of the present technology, the set of fields comprises a first set of fields that are exposed to the user, and a second set of fields that are not exposed to the user.

In aspects of the present technology, the first set of rules of creation applies only to the first set of fields that are exposed to the user.

In aspects of the present technology, the first set of fields, and the first and second set of rules are identical for all identities of the user.

In aspects of the present technology, the API is further configured to check the identity of user as a permitted user.

In aspects of the present technology, the API is further configured to check that the user invokes the primitives in compliance with the set of fields and the first set of rules of creation, and assembles the primitives in compliance with the second set of rules of assembly.

In aspects of the present technology, the system further comprises a $3^{rd}$ party API to provide the workflow engine upon request, configuration information for computing the overlay configuration.

In aspects of the present technology, the underlay fabric is a network with spine-leaf topology between the edge and the ToR switch.

In aspects of the present technology, the system further comprises a database communicably connected to the API and the workflow engine, and configured to store information about the pushed overlay configuration.

In aspects of the present technology, the database is further configured to receive from the API a request to lock a networking resource, to lock the configuration information about the networking resource, to receive from the workflow engine a request to unlock the networking resource, and to unlock the configuration information about the networking resource.

In aspects of the present technology, the API provides to the user an acknowledgement upon each invoking of one of, or assembly of two of, the primitives from the set of primitives.

In the context of the present description, unless expressly provided otherwise, a "processor" may refer, but is not limited to, any type of "computing system", "electronic device", "computer-based system", "controller unit", "monitoring device", "server" and/or any combination thereof appropriate to the relevant task at hand, in relation to receiving, storing, processing, and/or forwarding data.

In the context of the present specification, the expression "FPGA" is intended to include Field Programmable Gate Array computing systems, available on the market at the time of filing this patent application, such as references Xilinx VU9P, or Intel Stratix V, and any subsequent equivalent technologies becoming available, regardless of their name, consisting in computing system hardware programmable with software.

In the context of the present description, a "processor" may include a single dedicated processor, a single shared processor, or a plurality of individual processors, some of which may be shared. A "processor" may be a general purpose processor, such as a central processing unit (CPU), a processor dedicated to a specific purpose, or a processor implemented in a FPGA. Other hardware and software, conventional and/or custom, may also be included in a "processor".

In the context of the present description, unless expressly provided otherwise, the expression "memory" is intended to include Random Access storage systems, available on the market at the time of filing this patent application, and any subsequent equivalent technologies becoming available, regardless of their name, consisting in computing system media for storing digital information. An example of such memory may be a Quad Data Rate (QDR) Static Random Access Memory (SRAM).

In the context of the present description, the functional steps shown in the figures, may be provided through the use of dedicated hardware, as well as hardware capable of executing software in association with appropriate software.

Still in the context of the present description, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present description, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 8a-8b represent a specific asynchronous workflow for configuring the overlay network involved in the "bare metal" use case of FIG. 2, using the elements of FIG. 6;

FIG. 9 represents a specific asynchronous workflow for configuring the overlay network involved in the "public cloud" use case of FIG. 3, using the elements of FIG. 6;

FIGS. 10a-e represent examples of assemblies of primitives leading to connectivity;

It should be noted that, unless otherwise explicitly specified herein, the drawings are not to scale. Finally, elements that are identical from one drawing to the other bear the same numeral reference across drawings.

DETAILED DESCRIPTION

Figure 1:
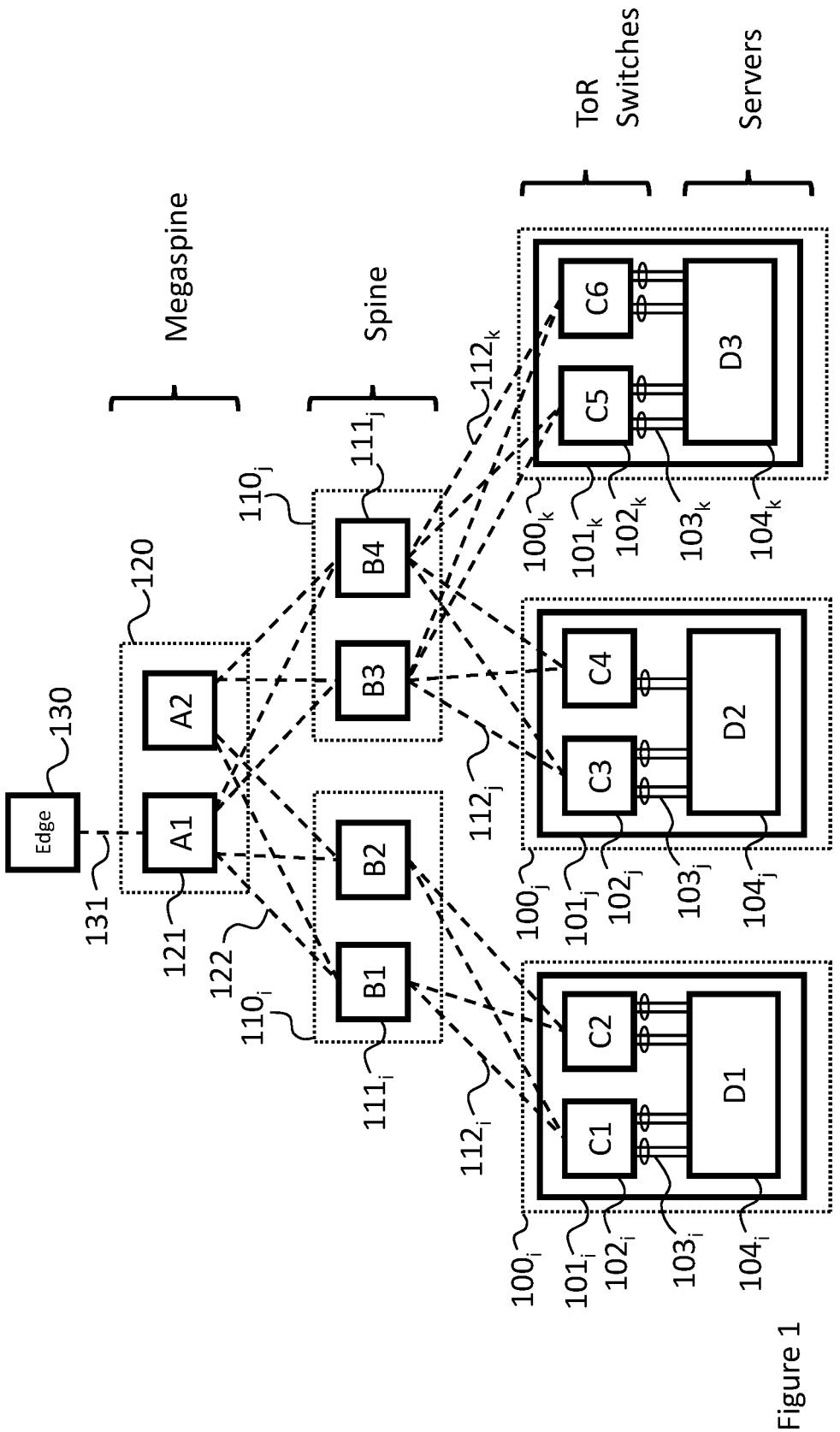
FIG. 1 depicts a networking topology that may be implemented in a datacenter.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some aspects of the present technology, the processor may be a general purpose processor, such as a central processing unit (CPU) or a processor dedicated to a specific purpose, such as a digital signal processor (DSP). In the aforementioned, explicit use of the term a «processor» should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that «module» may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Referring to FIG. 1, there is shown a networking topology that may be implemented in a datacenter. The person skilled in the art will appreciate that aspects of the present technology may equally be applied to other types of datacenter networking topologies, as will be described in greater details herein below.

The depicted networking topology is of the known type «spine-leaf». A megaspine 120 includes switches 121. The implementation of megaspine 120 is not particularly limited, even though two switches $A_1$ and $A_2$ are represented for simplification purposes. The megaspine in the datacenter network fabric may include one, or more than two switches.

Switch $A_1$ is linked through link 131 to an Edge 130, merely as an example of the environment in which the present technology may operate.

As will be appreciated by the person skilled in the art, "switch" as used herein is not limiting to a networking equipment capable of handling L2 communication level in the OSI model, but rather is intended to generically designate any networking equipment capable of handling L2-L7 communication levels.

A spine includes two spine modules 110$_i$ and 110$_j$, with each spine module including switches 111$_i$ and 111$_j$. The implementation of the spine and of the spine modules 110$_i$ and 110$_j$ is not particularly limited, even though two spine modules, and two switches per spine module, respectively $B_1$-$B_2$ and $B_3$-$B_4$, are represented for simplification purposes. The spine in the datacenter network fabric may include one, or more than two spine modules. A spine module may include one, or more than two switches.

Switches $A_1$ and $A_2$ interconnect with switches $B_1$-$B_4$ through links 122.

The hierarchy spine-megaspine is only one example: the topology and the datacenter network fabric may also have only one of spine or megaspine.

Leaves 100$_i$ and 100$_j$ each include respectively a rack 101$_i$-101$_j$, Top of Rack («ToR») switches 102$_i$-102$_j$, and servers 104$_i$-104$_j$. It is to be noted that servers 104$_i$-104$_j$ may each comprise one or more physically distinct servers or hosts interconnected by the ToR switches 102$_i$-102$_j$ (not represented on FIG. 1).

The implementation of the leaves 100$_i$ and 100$_j$ is not particularly limited, even though two leaves, two switches per leaf, respectively $C_1$-$C_2$ and $C_3$-$C_4$, and one server, respectively $D_1$ and $D_2$ are represented for simplification purposes. One, or more than two leaves may be implemented in the datacenter topology. A rack may include one, or more than two ToR switches, and more than one server.

ToR switches $C_1$-$C_2$ and $C_3$-$C_4$ interconnect respectively with switches $B_1$-$B_2$ and $B_3$-$B_4$ through respectively links 112$_i$ and 112$_j$, and with servers $D_1$-$D_2$ through respectively links 103$_i$ and 103$_j$.

The number of ports per switch $A_i$, $B_i$ or $C_i$, and the number of links 122, or 112$_i$-112$_j$ may be different. For example, the represented redundancy may not actually be implemented, without departing from the scope of the present technology.

Conversely, Multi Chassis Link Aggregation may be used between two ToR switches in a rack (not represented on FIG. 1), allowing to interconnect them and use them as one logical switch for the purpose of L2 protocol.

It is to be noted that switches $A_i$, $B_i$ and $C_i$ may be of a different vendor, or of a different model from the same vendor, without departing from the scope of the present technology.

It is further to be noted that the configuration of ToR switches $C_i$ may involve asymmetry between two ToR switches on the same rack (not represented on FIG. 1) without departing from the scope of the present technology: one ToR switch may not have the same configuration as the other ToR switch.

In the represented topology, ToR switches $C_1$-$C_4$ mesh into the spine, forming the access layer that delivers network connection points for racks into the datacenter. Leaves 100$_i$ and 100$_j$ provide the immediate network device behind the servers 104$_i$ and 104$_j$ which receive L2 traffic that may have to be transmitted on to another leaf in the network fabric. Thus leaf ToR switches $C_1$-$C_4$ may be considered a Network Virtualization Endpoint («NVE»), as an entry point/exit point to/from the overlay datacenter network. In this context, a NVE is a datacenter network entity that sits at the edge of an underlay network and implements L2 and/or L3 network virtualization functions. The datacenter network-facing side of the NVE uses the underlying L3 network to tunnel tenant frames to and from other NVEs. The tenant-facing side of the NVE sends and receives ethernet frames to and from individual servers.

With such a networking topology, several use cases may be available, each serving the particular needs of a customer by an entity operating the datacenter. For example, in a first use case, as depicted FIG. 2, dedicated hardware may be made available to the customer, in the form of two hosts 201 and 202 in the leaf 100$_i$, and two hosts 203 and 204 in the leaf 100$_j$.

In this first use case, hosts 201-204 are under control by the customer. Such an offering to the customer by the entity operating the datacenter may be referred to as "bare metal" offering.

Figure 2:
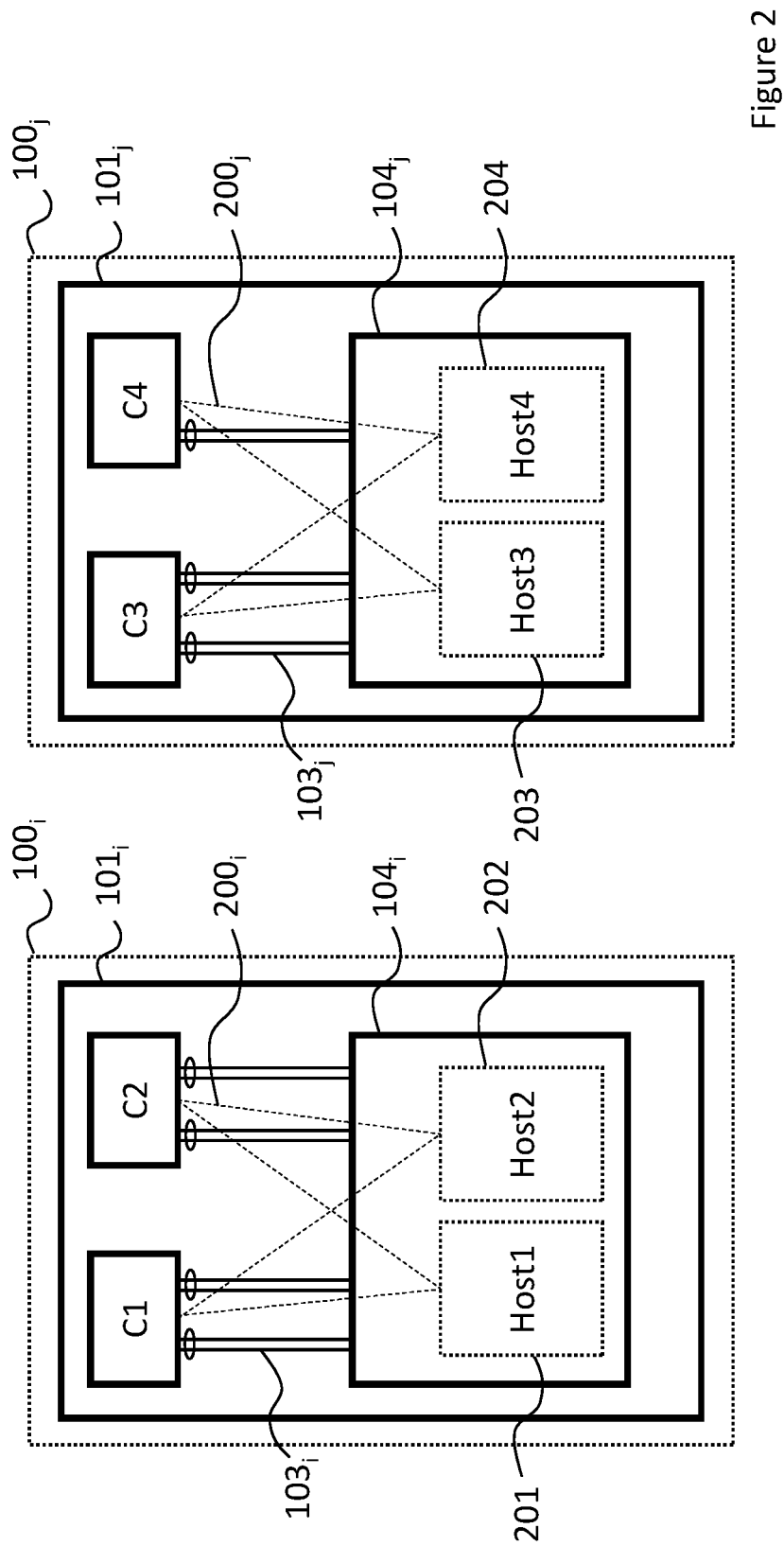
FIG. 2 illustrates a first use case in the networking topology of FIG. 1, where dedicated hardware may be made available to a customer of the datacenter ("bare metal" use case)

In this environment as depicted FIG. 1, complemented with FIG. 2, links 112$_i$ (respectively links 112$_j$) may consist of multiple sub-links (each sub-link may use LinkAggregation technologies to aggregate multiple physical links), used for different purposes. Such purpose could be to carry public or private networks from the host 201/202 (respectively 203/204) to the ToR switches C1/C2 (respectively ToR switches C3/C4). ToR switches C1-C4 may be configured as NVE. One example of such implementation would separate each host network (public/private) in a separate VLAN for client isolation. To achieve this, the connection protocol used on each sub-link may be a Layer 3 802.1Q access. Public L3 route could be statically defined on C1/C2 (respectively C3/C4) and announced to Edges 130 trough eVPN. Private L2 routes could be defined via a simple VXLAN flood and learn process to other NVEs outside of 100$_i$ (e.g. C3/C4 in 100$_j$).

Figure 3:
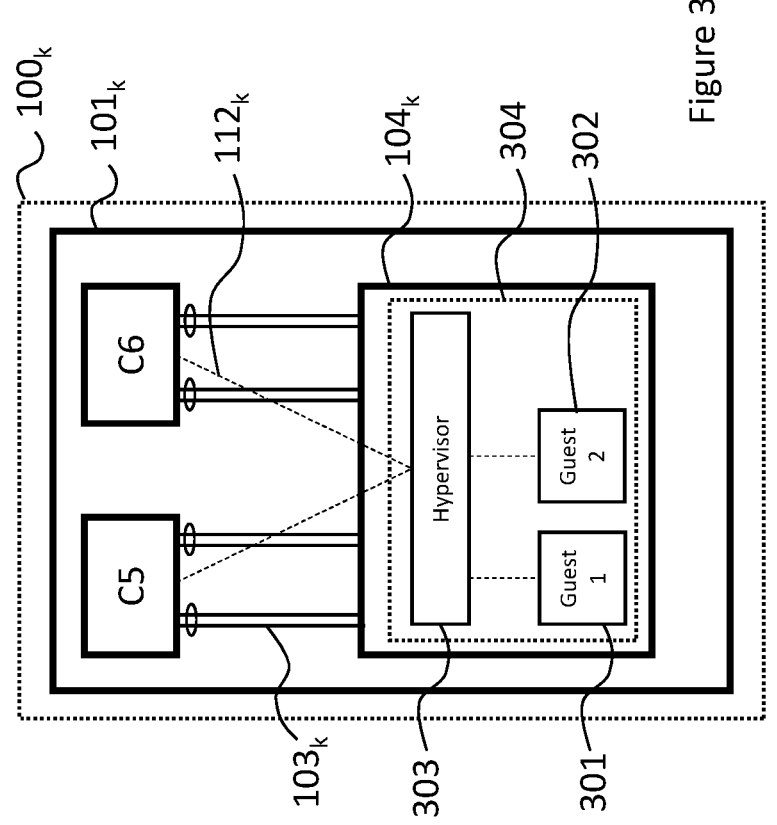
FIG. 3 illustrates a second use case in the networking topology of FIG. 1, where virtual computing resources may be made available to the customer of the datacenter ("public cloud" use case)

For example, in a second use case that may be available with the networking topology of FIG. 1, and as depicted FIG. 3, virtual computing resources may be made available to the customer, in the form of two guests 301 and 302 configured under a cloud computing platform such as Hypervisor 303 (for example: QEMU software) in a host 304 of the leaf 100$_k$.

In this second use case, guests 301 and 302 are under control by the customer, while host 304 is not: host 304 may be configured as a NVE, and different from the first use case of FIG. 2, TOR switches C5-C6 are not configured as NVE, and they are merely one of the connecting devices in the overlay network. Such an offering to the customer by the entity operating the datacenter may be referred to as "public cloud" offering. In this environment, links 112$_k$ may consist of a simple Layer 3 802.1Q trunk (with a single physical link per host 304). Separation between private and public network is left to the host. To achieve this, the host may BGP peer itself with other hosts (located in other leafs or not) or Edges.

Figure 4:
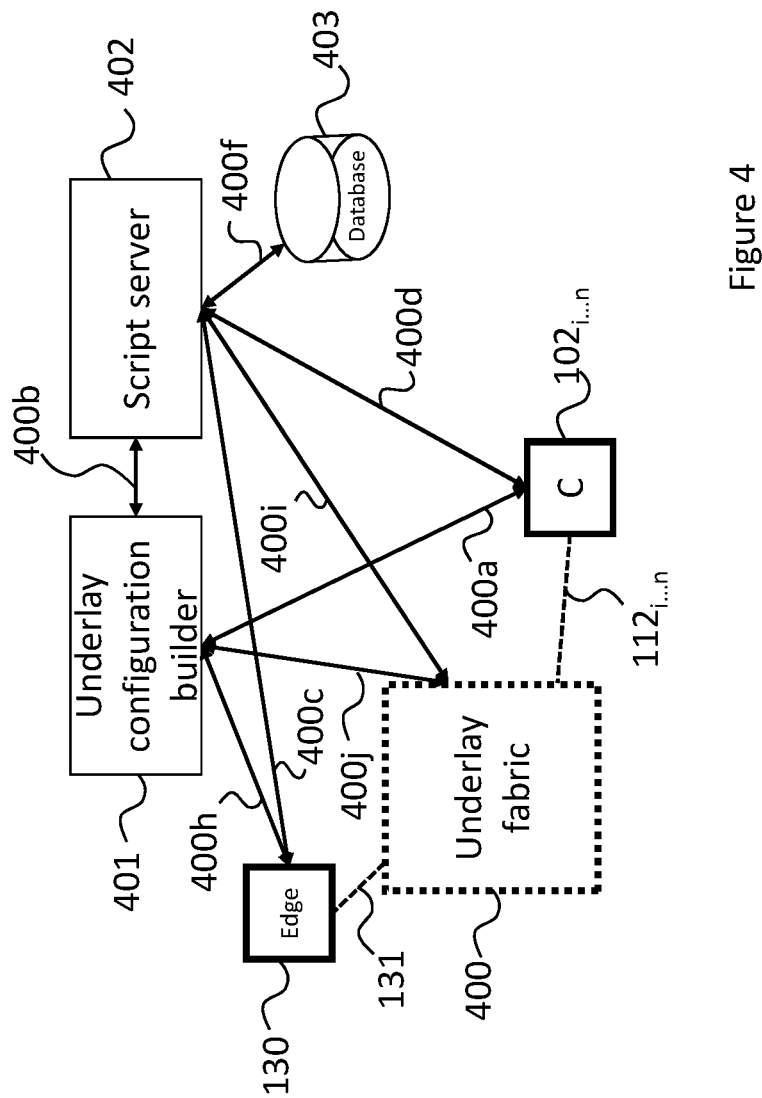
FIG. 4 depicts elements to configure an underlay network in the exemplary topology of FIG. 1.

FIG. 4 depicts elements to configure an underlay network in the networking topology of FIG. 1. Generally speaking, a Script server 402, a Database 403, an Underlay Configuration builder 401, and an Underlay fabric 400 may be implemented for the present technology. The person skilled in the art will appreciate both that the representation in FIG. 4 is a logical representation without reference to a particularly necessary corresponding hardware implementation, and that other equivalent logical implementations may be had without departing from the scope of the present technology. In particular, Script server 402, and/or Database 403 and/or Underlay Configuration builder 401 may be integrated into a single data processing equipment, an exemplary description being provided further down in relation to FIG. 11. The person skilled in the art will also appreciate that the Underlay fabric 400 represents, as an example, the spine-megaspine topology and datacenter network fabric of FIG. 1.

Generally, the Script server 402 may:
through links 400$f$, read/write the Database 403;
through links 400$d$, receive/request information from/to the ToR switches 102$_{i \ldots n}$;

through links 400$c$ receive/request information from/to the Edge 130;
through links 400$b$ receive/request information from/to the Underlay Configuration builder 401; and
through links 400$i$ receive/request information from/to the Underlay fabric 400.

Generally, the Underlay Configuration builder 401 may, through links 400$j$ and 400$a$ and 400$h$, receive/request information from/to respectively the Underlay fabric 400, the ToR switches 102$_{i \ldots n}$, and the Edge 130, and push underlay configurations to the same, upon commands received from the Script server 402.

Generally, the Database 403 may store information about the Edge 130, the underlay configurations pushed to the Edge 130 and the Underlay fabric 400 generally, and that of ToR switches 102$_{i \ldots n}$ in particular.

Once underlay configurations are complete, all networking devices from ToR switches, to spine, megaspine and Edge of FIG. 1 may communicate, ie. all such networking devices are configured to communicate from anyone one of them to any other one of them.

Also, once underlay configurations are complete, the present technology will abstract with primitives the overlay network configurations required by the various use cases, as involved in the various businesses and customer services rendered through the datacenter. With a single tool, overlay network configuration may be deployed addressing all possible use cases in the datacenter. The NVE, or last equipment under control by the entity operating the datacenter, may vary depending on the use case. For example, it may be the ToR switches C1-C4 in the use case of FIG. 2 ("bare metal"), or the Hosts 104$_k$ in the use case of FIG. 3 ("public cloud"). With the present technology, the difference in NVE is abstracted, and the difference in network configurations transparent to the user of the present technology.

Figure 5:
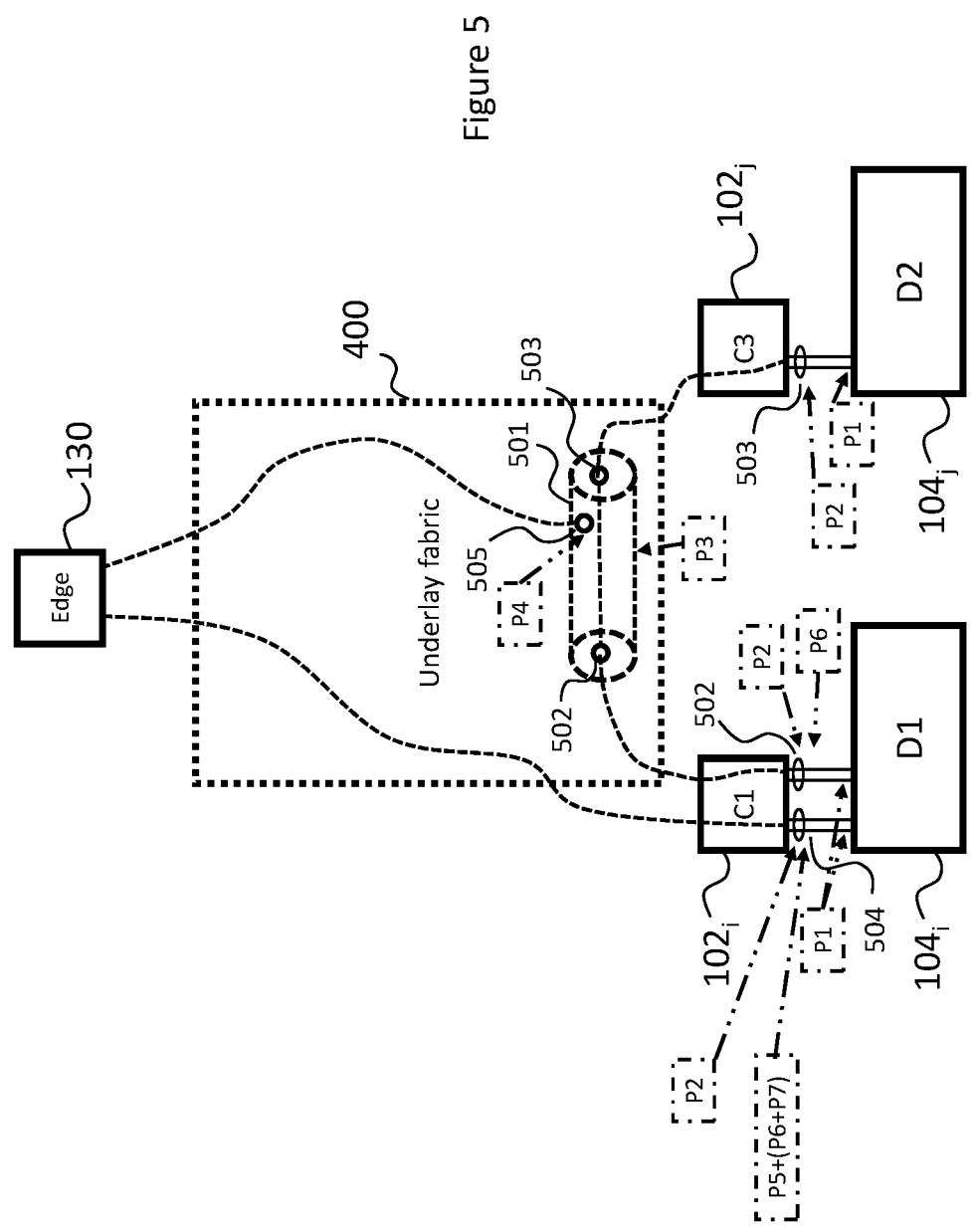
FIG. 5 illustrates a set of primitives according to the present technology involved in the "bare metal" use case of FIG. 2.

FIG. 5 illustrates a set of primitives according to the present technology involved in the "bare metal" use case of FIG. 2. There may for example be 7 types of available Primitives: P1-P7, as detailed below.

Instantiating a given Primitive allows a user to create an instance of an object type, for example: a Port type, a Physical port type, a Network type, etc.

While Primitives in themselves merely represent the creation and provisioning of a connectivity object, assembly of Primitives leads to connectivity.

The following Primitives may be available according to the present technology:

P1: Physical port on a ToR switch. On FIG. 5, P1 points for example, merely for the sake of readability, to 4 physical ports on server D1, and 2 physical ports on server D2.

P2: Port. The Primitive, if assembled with one or more Primitives P1, represents an aggregation/association of one or several physical ports. On FIG. 5, P2 points for example to:
the aggregation/associations 502 and 503 of physical ports between respectively ToR switch C1 and server D1, and ToR switch C2 and server D2; and
the aggregation/association 504 of physical ports between ToR switch C1 and server D1.

P3: Network. The Primitive, if assembled with one or more Primitives, represents a container that may aggregate/associate ports (assembly with Primitives P2). On FIG. 5, P3 points for example to a network 501 that aggregates/associates ports 502 and 503, conferring a server to server connectivity.

P4: Endpoint. If assembled with a Primitive P3, may represent connectivity external to the Underlay fabric 400. On FIG. 5, P4 points for example to an endpoint 505 providing external connectivity to network 501.

P5: FloatingIP. If assembled with a Primitive P2, may represent internet connectivity for the port instantiated with P2. On FIG. 5, P5 points for example to port 504 associating a public IP to it, and conferring a server to edge connectivity.

P6: Security group. If assembled with a Primitive P2, may apply restrictions controlling the type of traffic that is allowed to reach and leave the port.

P7: Quality of Service (QoS) policy. If assembled with a Primitive P2, may apply restrictions controlling the resource utilization of traffic reaching and leaving the port.

The foregoing list of primitives is not in any way exhaustive, but merely represents examples of primitives that may be available according to the present technology, for supporting certain business use cases.

The person skilled in the art will appreciate that additions may be had to such a list of primitives to handle other business use cases (e.g. VPN, DHCP, DNS, etc.).

Even through represented on FIG. 5 in relation to one business use case ("bare metal", or FIG. 2), the above 7 types of available Primitives P1-P7 provided by the present technology are common with the "public cloud" (FIG. 3) use case, and a number of other business use cases, as they share a common set of Fields and of Rules. The Fields relate to a format or syntax of the Primitives. The Rules relate to creation and provisioning of connectivity objects, as well as assembly of Primitives, and may consist in (i) creation and provisioning Rules, and (ii) assembly of Primitives Rules.

Figure 6:
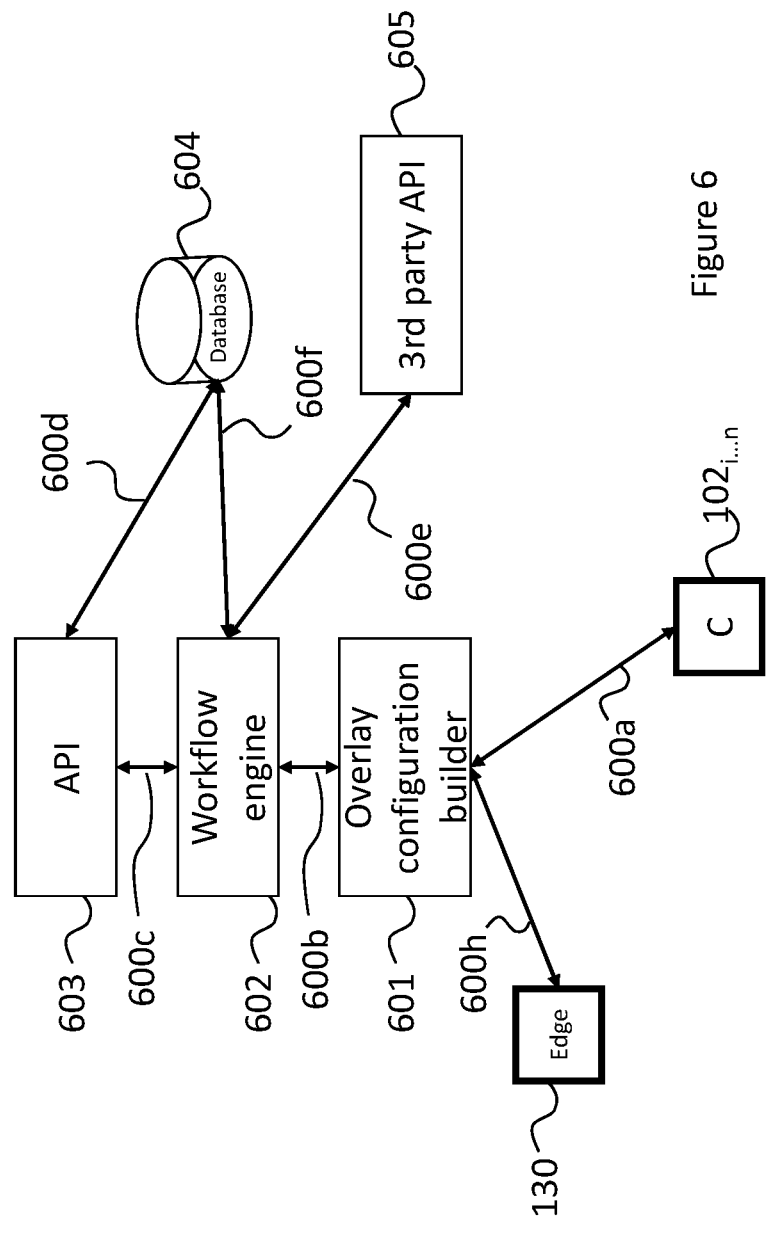
FIG. 6 depicts elements to configure an overlay network configuration in the networking topology of FIG. 1.

FIG. 6 depicts elements to configure an overlay network configuration in the networking topology of FIG. 1. Generally speaking, an API 603 (interfacing with a user of the present technology), a Workflow engine 602, an Overlay configuration builder 601, a Database 604 and optionally one or multiple $3^{rd}$ party APIs 605 (only one is represented for convenience) may be implemented in the present technology. The person skilled in the art will appreciate both that the representation in FIG. 6 is a logical representation without reference to a particularly necessary corresponding hardware implementation, and that other equivalent logical implementations may be had without departing from the scope of the present technology. In particular, API 603, and/or Workflow engine 602, and/or Overlay configuration builder 601, and/or Database 604 may be integrated into a single data processing equipment, an exemplary description being provided further down in relation to FIG. 11.

Generally, the API 603 may:

through links 600*d*, read/write the Database 604; and through links 600*c*, receive/request information from/to Workflow engine 602.

Generally, the Workflow engine 602 may:

through links 600*f*, read/write the Database 604;

through links 600*b*, receive/request information from/to Overlay configuration builder 601; and through links 600*e*, receive/request information from/to $3^{rd}$ party APIs 605.

Generally, the Overlay configuration builder 601 may:

through links 600*a* and 600*h*, receive/request information from/to respectively the ToR switches $102_{i \ldots n}$ and the Edge 130, and push overlay network configurations to the same, upon commands received from the Workflow engine 602.

Generally, the Database 604 may store information about the overlay network configurations pushed to the Edge 130 and/or the ToR switches $102_{i \ldots n}$. In all use cases, an overlay network configuration will be pushed to ToR switches $102_{i \ldots n}$, while an overlay network configuration will be pushed to the Edge 130 in certain cases only, for example in the use case of FIG. 2 "bare metal". This is because the NVE configuration needs differ depending on the business use case, some business use case not requiring additional Edge configuration.

Figure 7:
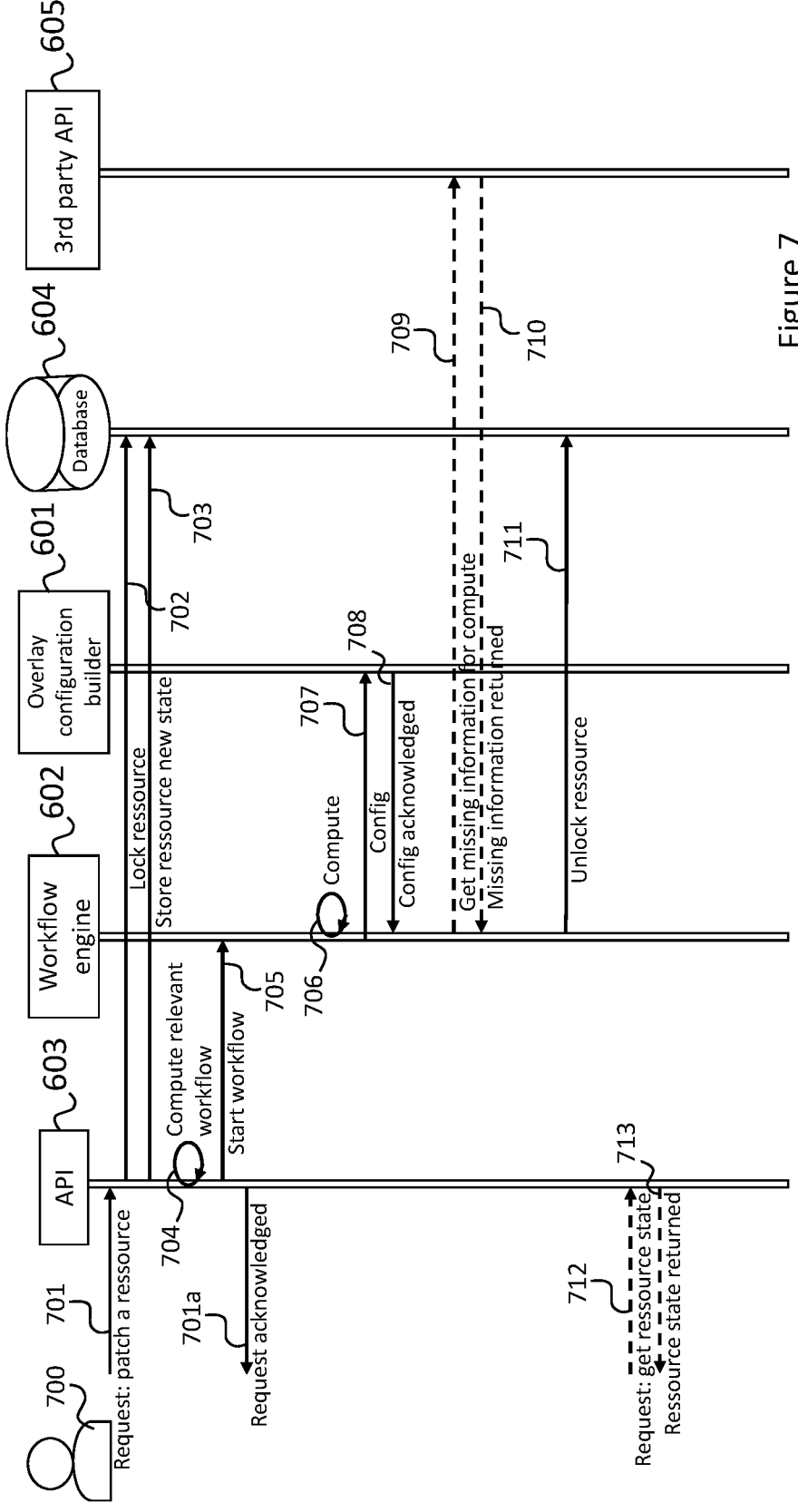
FIG. 7 represents generic asynchronous workflow steps for configuring an overlay network using the elements of FIG. 6.

FIG. 7 represents generic asynchronous workflow steps for configuring the overlay network using the elements of FIG. 6. A User 700 may interface with API 603. All steps are provided as examples to demonstrate some of the potential interactions between elements 601-605 and User 700. During actual workflows, some steps may be omitted, others may be had multiple times with different intents, depending on the specific business use case associated with said workflow.

As will be apparent to the person skilled in the art, even though not represented on FIG. 7, two verification mechanisms may be implemented in API 603: the first one may check the identity of User 700 as a permitted user, and associate that identity with a specific business use case. For example, through its identity, User 700 may be associated with a specific business unit that consumes "bare metal" business use case and resources in the datacenter. A second mechanism may check that User 700 only uses Primitives (i) in compliance with the set of Fields and the set of creation and provisioning Rules when invoking/instantiating the Primitives, and (ii) in compliance with the set of assembly of Primitives Rules when assembling such Primitives.

With workflow step 701, User 700 may form a resource patch request to API 603. The nature of the patch request may be that of POST or PATCH (creation or edition respectively) a given resource of the overlay network configuration. For example the given resource may be a physical port in the network.

With workflow step 702, API 603 may form a request to Database 604, to lock the given resource, ensuring data coherence in case of concurrent requests on the same resource.

With workflow step 703, API 603 may form a request to Database 604, to store a new state for the given resource.

With workflow step 704, API 603 may compute the workflow relevant to the nature of a network configuration task, in relation to the business use case associated with the identity of User 700, and may form a request with workflow step 705 to Workflow engine 602, to start such relevant workflow.

With workflow step 706, Workflow engine 602 may compute a given network configuration information to be pushed.

With workflow step 707, Workflow engine 602 may push a given configuration information to the Overlay configuration builder 601, which in turn may push the given configuration as part of the overlay network configuration, and return an acknowledgement to Workflow engine 602 with workflow step 708.

With workflow step 709, Workflow engine 602 may request missing configuration information through one or several $3^{rd}$ party APIs 605 (one is represented for convenience), configuration information that may be necessary for the computing of subsequent workflow steps. For example, such missing configuration information may be the parent subnet of a public IP address. One or several $3^{rd}$ party APIs

605 may return that requested missing configuration information with workflow step 710.

Once all configuration information is fully computed and pushed, Workflow engine 602 may request (with workflow step 711) Database 604 to unlock a previously locked resource.

As soon as possible, with workflow step 701*a*, User 700 may receive an acknowledgement from API 603 of its resource patch request (workflow step 701). This does not mean the request has been completed (as mentioned, this is an asynchronous process), only that the request has been acknowledged. The acknowledgement would alternatively be an indication to User 700 that its request at workflow step 701 made use or assembly of Primitives that were not in compliance with their set of Fields or Rules, and reject the request.

In addition, User 700 may, with workflow step 712, form a request to API 603 to get the state of a given resource, and receive that state with workflow step 713. Due to the asynchronous nature of the process, this type of request can be sent and answered at any given time after the workflow step 705.

Figure 8A:
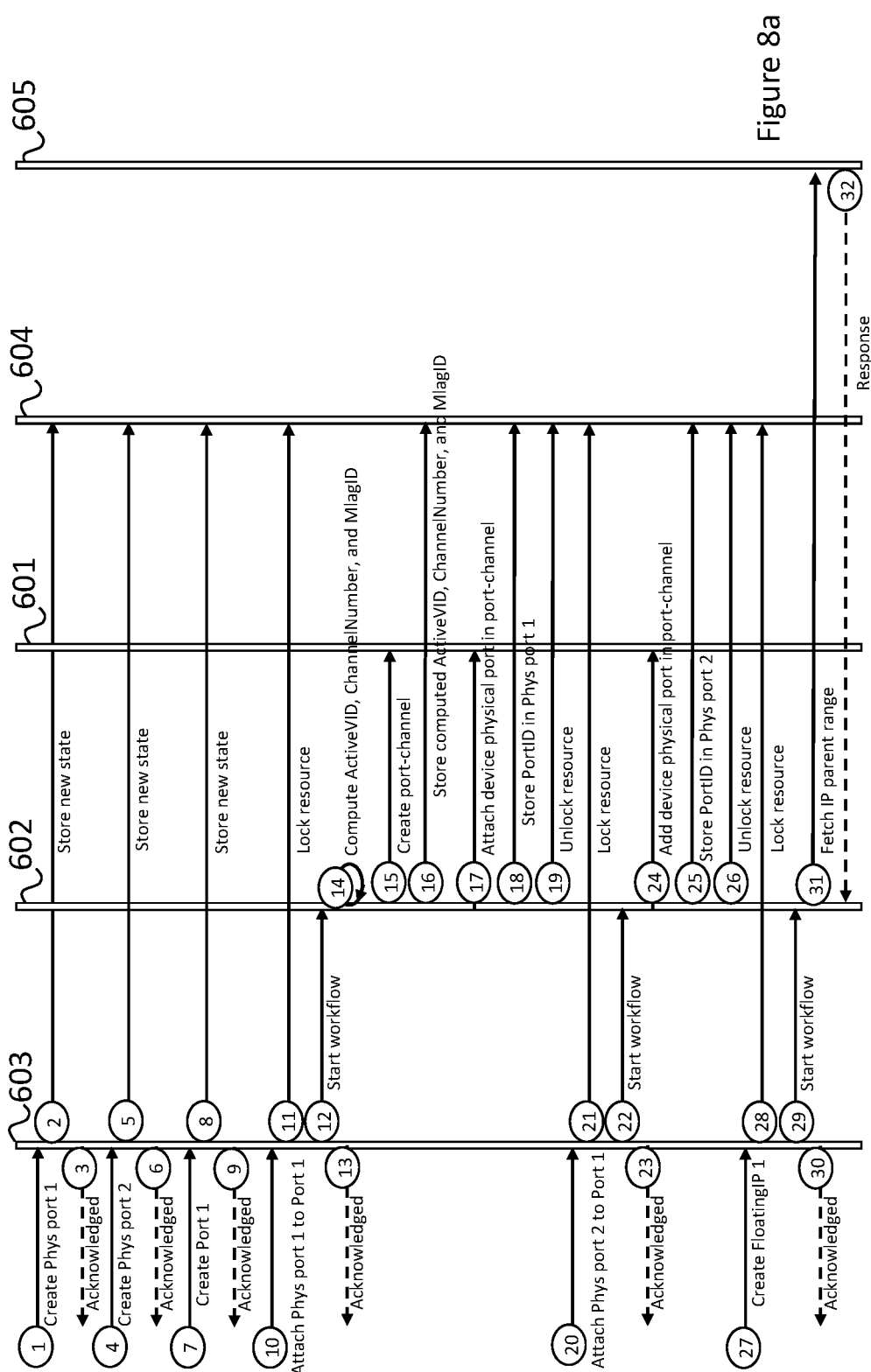

FIG. 8*a*-8*b* represents a specific asynchronous workflow for configuring the overlay network involved in the "bare metal" use case of FIG. 2, using the elements of FIG. 6.

The Primitives involved in such a workflow may have the following Fields according to the present technology. Only certain of these Fields may be exposed to the User 700, allowing it to more specifically define the instantiated object.

P1:

TABLE 1

| Field | Description | Exposed to User 700? |
|---|---|---|
| Name | Name of the physical port | Yes |
| ID | Unique ID for the ressource | Yes |
| Description | Description of the physical port | Yes |
| MacAddr | Host NIC MAC address | Yes |
| AdminStatus | True = power on, false = power off | Yes |
| DefaultInterface | True = physical port is designed as the default interface for aggregation configuration purposes | Yes |
| State | Either "discovery" (default), "active" or "shutdown" | Yes |
| ActiveVID | Allocated vlan ID to use when active | No |
| DeviceInterface | Name of the physical port in the equipment manufacturer's nomenclature | Yes |
| DeviceID | ID of the device of the physical port | Yes |
| PortID | ID of the associated port (P2) | Yes |

P2:

TABLE 2

| Field | Description | Exposed to User 700? |
|---|---|---|
| Name | Name of the port | Yes |
| ID | Unique ID for the ressource | Yes |
| Description | Description of the port | Yes |
| ChannelNumber | Port-channel number | No |
| ActiveVID | Vlan id in active state | No |
| MlagID | Mlag id | No |
| NetworkID | ID of a network (P3) the port can be associated with | Yes |
| IngressSecurityGroupIDs | IDs of an ingress security group (P6) the port can be associated with | Yes |

TABLE 2-continued

| Field | Description | Exposed to User 700? |
|---|---|---|
| EgressSecurityGroupIDs | IDs of an egress security group (P6) the port can be associated with | Yes |
| QosPolicyID | ID of a QoS policy (P7) the port can be associated with | Yes |
| FloatingIpID | ID of FloatingIP (P5) the port can be associated with. | Yes |

P5:

TABLE 3

| Field | Description | Exposed to User 700? |
|---|---|---|
| Description | Description of the FloatingIP | Yes |
| Type | Type of the FloatingIP (primary or failover) | Yes |
| Cidr | CIDR of the FloatingIP | Yes |
| Parent | FloatingIP's parent | Yes |
| ParentType | FloatingIP's parent type | Yes |
| PortID | Port on which the FloatingIP is attached | Yes |
| NullRoutedIPs | List of null routed IP in the range | Yes |
| NextHopID | ID of the next hop for failover i | Yes |
| ID | Unique ID for the ressource | Yes |

The Primitives involved in such a workflow may have the following creation and provisioning Rules according to the present technology. These rules apply only for Fields that are exposed to the User 700.

TABLE 4

| | |
|---|---|
| Physical port (P1) creation | Mac Address is mandatory and unique<br>Name is limited to 255 characters<br>Description is limited to 1024 characters<br>Device port name must respect the format:<br>Ethernet[0-9]+/[1-4]<br>Device port name must be unique on the same network device |
| Port (P2) creation | Name is limited to 255 characters<br>Description is limited to 1024 characters |
| FloatingIP (P5) creation | Description is limited to 1024s characters<br>Next hop must be a primary<br>CIDR must be unique<br>Must have a type, supported are<br>   primary<br>      IPv4: /32 only without next hop<br>      IPv6: /56 only without next hop<br>   failover<br>      IPv4: /24 to /32 with next hop being another<br>      primary IPv4 P5<br>      IPv6: not supported |

The Primitives involved in such a workflow may have the following assembly of Primitives Rules according to the present technology:

TABLE 5

| | |
|---|---|
| Physical port (P1) asssembly with Port (P2) | Physical port isn't linked to another port<br>Physical port is in active or shutdown state<br>All physical ports (including the new one) must be in the same cluster<br>Port must have 1 or a multiple of two of physical ports<br>Physical port in the port must be coupled by two with the same device port name (eg Ethernet[0-9]+/[1-4])<br>Port must have one physical port being the default interface |

TABLE 5-continued

| | |
|---|---|
| FloatingIP (P5) assembly with Port (P2) | Port must have at least one physical port active FloatingIP isn't linked to another port |

Going back to FIG. 8*a*, workflow steps are numbered 1 to 48 hereafter:

At workflow step 1, User 700 may request to API 603 to create a Physical port 1 (through invoking Primitive P1);

at workflow step 2, API 603 may form a request to Database 604, to store a new state for the Physical port 1;

at workflow step 3, User 700 may receive an acknowledgement from API 603 of its request at workflow step 1;

at workflow step 4, User 700 may request to API 603 to create a Physical port 2 (through invoking Primitive P1);

at workflow step 5, API 603 may form a request to Database 604, to store a new state for the Physical port 2;

at workflow step 6, User 700 may receive an acknowledgement from API 603 of its request at workflow step 4;

at workflow step 7, User 700 may request to API 603 to create a Port 1 (through invoking Primitive P2);

at workflow step 8, API 603 may form a request to Database 604, to store a new state for the Port 1;

at workflow step 9, User 700 may receive an acknowledgement from API 603 of its request at workflow step 7;

at workflow step 10, User 700 may request to API 603 to attach Physical port 1 to Port 1 (through assembly of Primitives P1 and P2);

at workflow step 11, API 603 may form a request to Database 604, to lock both the Physical port 1 and Port 1;

at workflow step 12, API 603 after computing the workflow in relation to the current business use case, may form a request to Workflow engine 602, to start such relevant workflow;

at workflow step 13, User 700 may receive an acknowledgement from API 603 of its request at workflow step 10;

at workflow step 14, Workflow engine 602 may compute ActiveVID, ChannelNumber, and MlagID in relation to the current business use case, such computation could be a simple election across an election pool to find the first available ID;

at workflow step 15, Workflow engine 602 may request the Overlay configuration builder 601 to create a port-channel; assuming the Fields and Rules as described in tables 1-5 above, this request may include the following configuration information:

interface Port-Channel<Port.ChannelNumber>
description D:HOST::
switchport access vlan<Port.ActiveVID>
port-channel lacp fallback static
port-channel lacp fallback timeout 5
mlag<Port.MlagID>

At workflow step 16, Workflow engine 602 may request Database 604 to store the ActiveVID, ChannelNumber, and MlagID computed at workflow step 14.

It is to be noted that workflow steps 14-16 are performed only once for the first physical port attachment to a port (so in this case: Physical port 1 attachment to Port 1).

At workflow step 17, Workflow engine 602 may request the Overlay configuration builder 601 to attach a device physical port in the port-channel; assuming the Fields and Rules as described in tables 1-5 above, this request may include the following configuration information:

interface <PhysicalPort.DeviceInterface>
lacp port-priority <int(PhysicalPort.DefaultInterface)+ 1*1000>
channel-group <Port.ChannelNumber> mode active It is to be noted that steps 14-17 are performed only for the first physical port attachment to a port (so in this case: Physical port 1 attachment to Port 1).

At workflow step 18, Workflow engine 602 may request Database 604 to store the PortID in the Physical port 1.

At workflow step 19, Workflow engine 602 may request Database 604 to unlock the resources locked at workflow step 11;

at workflow step 20, User 700 may request to API 603 to attach Physical port 2 to Port 1 (through assembly of Primitives P1 and P2);

at workflow step 21, API 603 may form a request to Database 604, to lock both the Physical port 2 and Port 1;

at workflow step 22, API 603 after computing the workflow relevant to the nature of the request made in relation to the current business use case, may form a request to Workflow engine 602, to start such relevant workflow;

at workflow step 23, User 700 may receive an acknowledgement from API 603 of its request at workflow step 20;

at workflow step 24, Workflow engine 602 may request the Overlay configuration builder 601 to add a device physical port in the port-channel; assuming the Fields and Rules as described in tables 1-5 above, this request may include the following configuration information:

interface <PhysicalPort.DeviceInterface>
lacp port-priority <int(PhysicalPort.DefaultInterface)+ 1*1000>
channel-group <Port.ChannelNumber> mode active At workflow step 25, Workflow engine 602 may request Database 604 to store the PortID in the Physical port 2;

at workflow step 26, Workflow engine 602 may request Database 604 to unlock the resources locked at workflow step 21;

at workflow step 27, User 700 may request to API 603 to create a FloatingIP 1 (through invoking Primitive P5);

at workflow step 28, API 603 may form a request to Database 604, to lock FloatingIP 1;

at workflow step 29, API 603 after computing the workflow relevant to the nature of the request made in relation to the current business use case, may form a request to Workflow engine 602, to start such relevant workflow;

at workflow step 30, User 700 may receive an acknowledgement from API 603 of its request at workflow step 27;

at workflow step 31, Workflow engine 602 may request missing IP parent range through one or several 3rd party APIs 605 (one is represented for convenience);

at workflow step 32, one or several 3rd party APIs may return that requested missing configuration information to Workflow engine 602;

at workflow step 33, Workflow engine 602 may request Database 604 to store the FloatingIP 1 parent range and the type fetched at workflow step 31;

at workflow step 34, Workflow engine 602 may request Database 604 to unlock the resources locked at workflow step 28;

at workflow step 35, User 700 may request to API 603 to attach the FloatingIP 1 to the Port 1 (through assembly of Primitives P5 and P2);

at workflow step 36, API 603 may form a request to Database 604, to lock both the FloatingIP 1 and Port 1 resources;

at workflow step 37, API 603 after computing the workflow relevant to the nature of the request made in relation to the current business use case, may form a request to Workflow engine 602, to start such relevant workflow;

at workflow step 38, User 700 may receive an acknowledgement from API 603 of its request at workflow step 35;

at workflow step 39, Workflow engine 602 may request the Overlay configuration builder 601 to configure prefix-list and bgp aggregate for each edge.

It is to be noted that this step 39 (repeated as the case may be for all edges) is performed only the first time an IP in the IP parent range is used.

Assuming the Fields and Rules as described in tables 1-5 above, this request may include the following configuration information:

ip prefix-list PL_PREFIX
seq <ELECTED_SEQ_ID> permit <FloatingIP.parent>
router bgp <Edge.ASN>
vrf PREFIX
aggregate <FloatingIP.parent> summary-only At workflow step 40, Workflow engine 602 may compute ActiveVID for Physical Port 1 and 2 and Port 1;

at workflow step 41, Workflow engine 602 may request the Overlay configuration builder 601 to configure configure VLAN on interfaces, VLAN interface and VRF; assuming the Fields and Rules as described in tables 1-5 above, this request may include the following configuration information:

interface P ort-Channel<P ort. ChannelNumber>
switchport access vlan<Port.ActiveVID>
interface Ethernet<PhysicalPort.DeviceInterface>
switchport access vlan <PhysicalPort.ActiveVID>
interface Vlan<Port.ActiveVID>
vrf instance <Port.ActiveVID>
description CUSTOMER_VLAN_<Port.ActiveVID>

At workflow step 42, Workflow engine 602 may request Database 604 to store the Port 1 ActiveIDcomputed at workflow step 40;

at workflow step 43, Workflow engine 602 may request Database 604 to store the Physical port 1 and 2 ActiveID computed at workflow step 40.

It is to be noted that steps 40 to 43 are performed only on the first FloatingIP attachment to a Port, so in this case FloatingIP 1 attachment to Port 1.

At workflow step 44, Workflow engine 602 may request the Overlay configuration builder 601 to configure IPv4 routing; assuming the Fields and Rules as described in tables 1-5 above, this request may include the following configuration information:

ip route vrf <Port.ActiveVID> <FloatingIP.CIDR> Vlan <Port.ActiveVID> tag 100.

This step may instead be configuring IPv6 routing and address, depending on the FloatingIP type, as is appreciated by the person skilled in the art.

At workflow step 45, Workflow engine 602 may request Database 604 to store the ID of Port 1 in FloatingIP 1;

at workflow step 46, Workflow engine 602 may request Database 604 to unlock the resources locked at workflow step 36.

FIG. 9 represents a specific asynchronous workflow for configuring the overlay network involved in the "public cloud" use case of FIG. 3, using the elements of FIG. 6. Workflow steps are numbered 1 to 31 for readability hereafter, without any reference or any relation to any of the workflow steps of FIG. 8a-8b.

At workflow step 1, User 700 may request to API 603 to create a Physical port 1 (through invoking Primitive P1);

at workflow step 2, API 603 may form a request to Database 604, to store a new state for the Physical port 1;

at workflow step 3, User 700 may receive an acknowledgement from API 603 of its request at workflow step 1;

at workflow step 4, User 700 may request to API 603 to create a Physical port 2 (through invoking Primitive P1);

at workflow step 5, API 603 may form a request to Database 604, to store a new state for the Physical port 2;

at workflow step 6, User 700 may receive an acknowledgement from API 603 of its request at workflow step 4;

at workflow step 7, User 700 may request to API 603 to create a Port 1 (through invoking Primitive P2);

at workflow step 8, API 603 may form a request to Database 604, to store a new state for the Port 1;

at workflow step 9, User 700 may receive an acknowledgement from API 603 of its request at workflow step 7;

at workflow step 10, User 700 may request to API 603 to attach Physical port 1 to Port 1 (through assembly of Primitives P1 and P2);

at workflow step 11, API 603 may form a request to Database 604, to lock both the Physical port 1 and Port 1;

at workflow step 12, API 603 after computing the workflow in relation to the current business use case, may form a request to Workflow engine 602, to start such relevant workflow;

at workflow step 13, User 700 may receive an acknowledgement from API 603 of its request at workflow step 10;

at workflow step 14, Workflow engine 602 may request the Overlay configuration builder 601 to configure an ethernet interface; assuming the Fields and Rules as described in tables 1-5 above, this request may include the following configuration information:

interface<PhysicalPort.DeviceInterface>
description      D:host|<PhysicalPort.DeviceInterface>:: vlan100
switchport trunk native vlan 100
switchport trunk allowed vlan 10,20,100
switchport mode trunk At workflow step 15, Workflow engine 602 may request Database 604 to unlock the resources locked at workflow step 11;

at workflow step 16, User 700 may request to API 603 to attach Physical port 2 to Port 1 (through assembly of Primitives P1 and P2);

at workflow step 17, API 603 may form a request to Database 604, to lock both the Physical port 2 and Port 1;

at workflow step 18, API 603 after computing the workflow relevant to the nature of the request made in relation to the current business use case, may form a request to Workflow engine 602, to start such relevant workflow;

at workflow step 19, User 700 may receive an acknowledgement from API 603 of its request at workflow step 16;

at workflow step 20, Workflow engine 602 may request the Overlay configuration builder 601 to configure an ethernet interface; assuming the Fields and Rules as described in tables 1-5 above, this request may include the following configuration information:

interface <PhysicalPort.DeviceInterface>
description    D:host|<PhysicalPort.DeviceInterface>:: vlan100
switchport trunk native vlan 100
switchport trunk allowed vlan 10,20,100
switchport mode trunk At workflow step 21, Workflow engine 602 may request Database 604 to unlock the resources locked at workflow step 17;

at workflow step 22, User 700 may request to API 603 to create a FloatingIP 1 (through invoking Primitive P5);

at workflow step 23, API 603 may form a request to Database 604, to store a new state for the FloatingIP 1;

at workflow step 24, User 700 may receive an acknowledgement from API 603 of its request at workflow step 22;

at workflow step 25, User 700 may request to API 603 to attach the FloatingIP 1 to the Port 1 (through assembly of Primitives P5 and P2);

at workflow step 26, API 603 may form a request to Database 604, to lock both the FloatingIP 1 and Port 1 resources;

at workflow step 27, API 603 after computing the workflow relevant to the nature of the request made in relation to the current business use case, may form a request to Workflow engine 602, to start such relevant workflow;

at workflow step 28, User 700 may receive an acknowledgement from API 603 of its request at workflow step 25;

at workflow step 29, Workflow engine 602 may request the Overlay configuration builder 601 to configure a ToR switch bgp neighbour;

assuming the Fields and Rules as described in tables 1-5 above, this request may include the following configuration information:

router bgp <AS>
neighbor <FloatingIP.CIDR—MASK> peer-group PREFIX

At workflow step 30, Workflow engine 602 may request Database 604 to store the Port 1 ID in FloatingIP 1;

at workflow step 31, Workflow engine 602 may request Database 604 to unlock the resources locked at workflow step 27.

FIGS. 10a-e represent examples of assemblies of Primitives leading to standard connectivity schemes. In each case, the set of Primitives, when invoked and assembled, provide an abstracted view of the overlay configuration corresponding to the connectivity scheme. As will be appreciated by the person skilled in the art, they do not represent an exhaustive list of assembly possibilities, and all of the FIGS. 10a-e are independent and their associated network configurations totally unrelated.

FIG. 10a represents an assembly of Primitives leading to Public connectivity, with additional traffic and resources protection.

A Primitive P2 may be invoked to instantiate a Port 1 that may be assembled with:

two Primitives P1 invoked to instantiate respectively Physical ports 1 and 2;

a Primitive P5 invoked to instantiate a FloatingIP 1;

a Primitive P6 invoked to instantiate a Security group 1; and a Primitive P7 invoked to instantiate a QoS policy 1.

FIG. 10b represents an assembly of Primitives leading to private connectivity with additional external connectivity from outside the fabric.

A Primitive P2 may be invoked to instantiate a Port 1, and may be assembled with:

two Primitives P1 instantiate respectively Physical ports 1 and 2; and a Primitive P3 invoked to instantiate a Network 1.

The aforementioned Primitive P3 may also be assembled with a Primitive P4 invoked to instantiate an Endpoint 1.

FIG. 10c represent an assembly of Primitives leading to public connectivity, with additional traffic and resources protection as seen in FIG. 10a, but with additional FloatingIP providing more access paths to the service.

A Primitive P2 may be invoked to instantiate a Port 1, and may be assembled with:

two Primitives P1 invoked to instantiate respectively Physical ports 1 and 2;

three Primitives P5 invoked to instantiate respectively FloatingIP 1, 2 and 3;

a Primitive P6 invoked to instantiate a Security group 1; and a Primitive P7 invoked to instantiate a QoS policy 1.

Figures 10D, 10E:
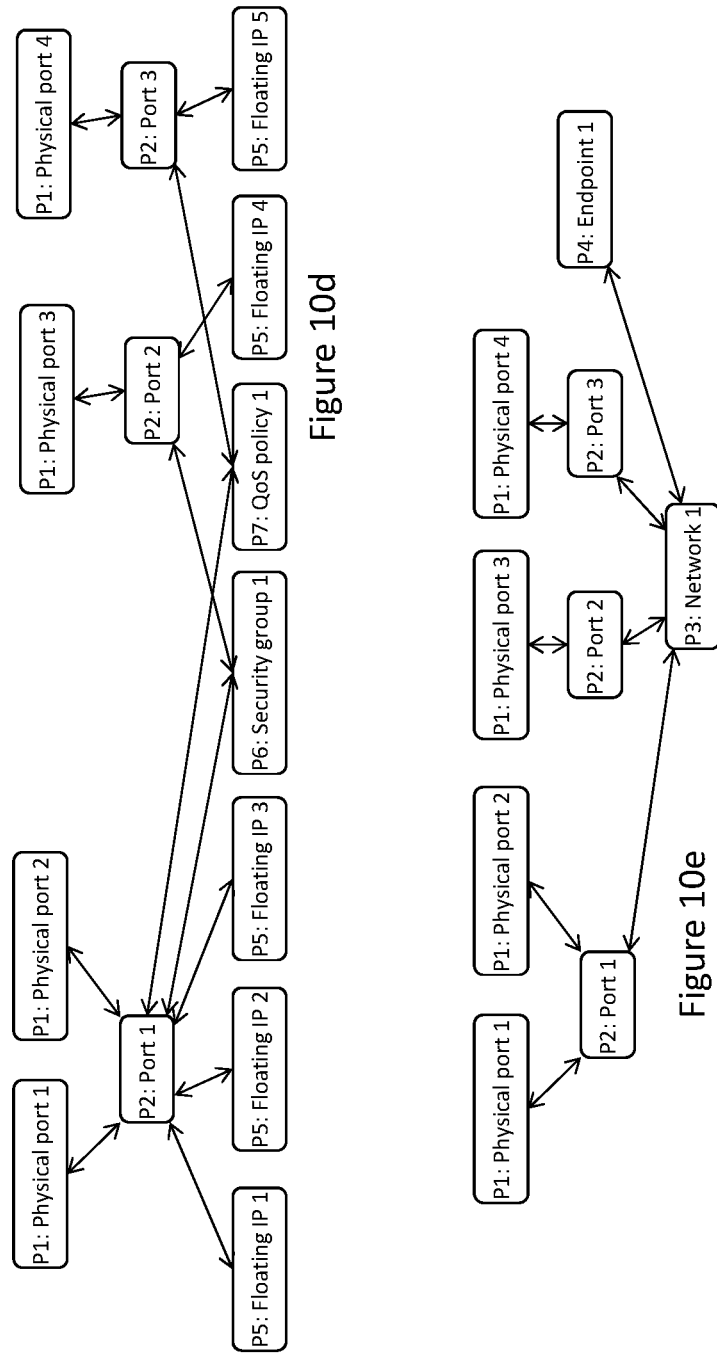

FIG. 10d represents an assembly of Primitives leading to two external Ports getting public connectivity while sharing non unique traffic and resources protection.

As in FIG. 10c, a Primitive P2 may be invoked to instantiate a Port 1, and may be assembled with:

two Primitives P1 invoked to instantiate respectively Physical ports 1 and 2;

three Primitives P5 invoked to instantiate respectively FloatingIP 1, 2 and 3;

a Primitive P6 invoked to instantiate a Security group 1; and a Primitive P7 invoked to instantiate a QoS policy 1.

In addition, a Primitive P2 may be invoked to instantiate a Port 2, and may be assembled with:

a Primitive P1 invoked to instantiate a Physical port 3;

a Primitive P5 invoked to instantiate a FloatingIP 4; and the aforementioned Primitive P6 invoked to instantiate the Security group 1.

In addition, a Primitive P2 may be invoked to instantiate a Port 3, and may be assembled with:

a Primitive P1 invoked to instantiate a Physical port 4;

a Primitive P5 invoked to instantiate a FloatingIP 5; and the aforementioned Primitive P7 invoked to instantiate the QoS policy 1.

FIG. 10e represents an assembly of Primitives leading to private connectivity from multiple ports in the fabric with additional external connectivity from outside the fabric.

A Primitive P2 may be invoked to instantiate a Port 1, and may be assembled with:

two Primitives P1 invoked to instantiate respectively Physical ports 1 and 2; and a Primitive P3 that may be invoked to instantiate a Network 1.

A Primitive P2 may be invoked to instantiate a Port 2, and may be assembled with:

a Primitive P1 invoked to instantiate a Physical port 3; and the aforementioned Primitive P3 invoked to instantiate the Network 1.

A Primitive P2 may be invoked to instantiate a Port 3, and may be assembled with:

a Primitive P1 invoked to instantiate a Physical port 4; and the aforementioned Primitive P3 invoked to instantiate the Network 1.

The aforementioned Primitive P3 may also be assembled with a Primitive P4 invoked to instantiate an Endpoint 1.

Figure 11:
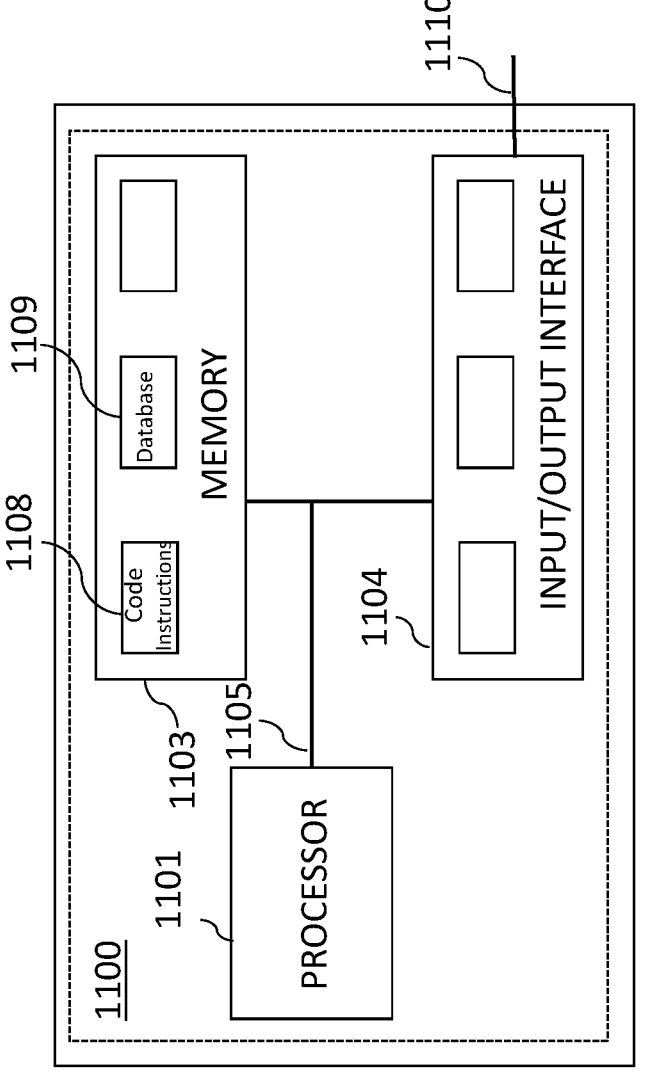
FIG. 11 illustrates a computing system that may be used in the present technology.

FIG. 11 illustrates a computing system that may be used in the present technology, for example in any one or all of the functional elements Underlay Configuration builder 401 or Script server 402 of FIG. 4, or API 603, Workflow engine 602, or Overlay configuration builder 601 of FIG. 6. As will be appreciated by the person skilled in the art, such computing system may be implemented in any other suitable hardware, software, and/or firmware, or a combination thereof, and may be a single physical entity, or several separate physical entities with a distributed functionality.

In some aspects of the present technology, the Computing system 1100 may comprise various hardware components including one or more single or multi-core processors collectively represented by a Processor 1101, a Memory 1103 and an Input/output interface 1104. In this context, the Processor 1101 may or may not be included in a FPGA. In some other aspect, the Computing system 1100 may be an "off the shelf" generic computing system. In some aspect, the Computing system 1100 may also be distributed amongst multiple systems. The Computing system 1100 may also be specifically dedicated to the implementation of the present technology. As a person in the art of the present technology may appreciate, multiple variations as to how the Computing system 1100 is implemented may be envisioned without departing from the scope of the present technology.

Communication between the various components of the Computing system 1100 may be enabled by one or more internal and/or external Buses 1105 (e.g. a PCI bus, universal serial bus, IEEE 1394 "Firewire" bus, SCSI bus, Serial-ATA bus, ARINC bus, etc.), to which the various hardware components are electronically coupled.

The Input/output interface 1104 may enable networking capabilities such as wire or wireless access. As an example, the Input/output interface 1104 may comprise a networking interface such as, but not limited to, a network port, a network socket, a network interface controller and the like. Multiple examples of how the networking interface may be implemented will become apparent to the person skilled in the art of the present technology.

The Memory 1103 may store Code instructions 1108, such as those part of, for example, a library, an application, etc. suitable for being loaded into the Memory 1103 and executed by the Processor 1101 for implementing the method and process steps according to the present technology. The Memory 1103 may also store a Database 1109. The person skilled in the art will appreciate that any of the Database 1109, the Code instructions 1108, and generally the Memory 1103, may also physically reside outside of the Computing System 1100, still within the scope of the present technology.

The Input/output interface 1104 may allow Computing System 1100 to be communicably connected to other processors through a Connection 1110.

While the above-described implementations have been described and shown with reference to particular steps performed in a particular order, it will be understood that these steps may be combined, sub-divided, or re-ordered without departing from the teachings of the present disclosure. At least some of the steps may be executed in parallel or in series. Accordingly, the order and grouping of the steps is not a limitation of the present technology. It should further be expressly understood that not all technical effects mentioned herein need to be enjoyed in each and every aspect of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A system for configuring a datacenter network, the system comprising:

an application programming interface (API) configured to receive a user input comprising a service category for the datacenter network, and specifying at least one networking component of the datacenter network to be provisioned, wherein the at least one networking component comprises a first set of fields that are exposed to a user and a second set of fields that are not exposed to the user, and wherein a first set of rules of creation applies only to the first set of fields that are exposed to the user, and a second set of rules of assembly applies only to the second set of fields that are not exposed to the user;

a workflow engine communicatively coupled to the API, the workflow engine configured to compute an overlay network configuration for the datacenter network based on the at least one networking component specified in the user input; and an overlay configuration builder configured to apply the overlay network configuration to at least one network switch in the datacenter network, thereby enabling provisioning of the at least one networking component specified in the user input;

wherein the at least one network switch comprises a top-of-rack (ToR) switch, the ToR switch being selectively configured as a network virtualization endpoint (NVE) based on the service category included in the user input.

2. The system of claim 1, wherein the first set of fields, and the first set of rules and the second set of rules are identical for all identities of the user.

3. The system of claim 1, wherein the API is further configured to check whether the user is a permitted user.

4. The system of claim 3, wherein the API is further configured to check that the user invokes the at least one networking component in compliance with the first set of fields and the second set of fields and the first set of rules of creation, and assembles the at least one networking component in compliance with the second set of rules of assembly.

5. The system of claim 1, wherein the datacenter network comprises an underlay fabric having a spine-leaf topology between the at least one network switch and the ToR switch.

6. The system of claim 1, further comprising a database communicably connected to the API and the workflow engine, and configured to store information about the overlay network configuration applied to the at least one network switch.

7. The system of claim 6, wherein the database is further configured to receive from the API a request to lock the at least one networking component, to lock the information about the overlay network configuration, to receive from the workflow engine a request to unlock the at least one networking component, and to unlock the information about the overlay network configuration.

8. The system of claim 1, wherein the API provides to the user an acknowledgement upon each invoking of the at least one networking component.

\* \* \* \* \*